US012279094B2

(12) United States Patent
Brouwer et al.

(10) Patent No.: US 12,279,094 B2
(45) Date of Patent: Apr. 15, 2025

(54) ACOUSTIC VALVE, AND HEARING DEVICE INCLUDING SUCH AN ACOUSTIC VALVE

(71) Applicant: Sonion Nederland B.V., Hoofddorp (NL)

(72) Inventors: Theodorus Gerardus Maria Brouwer, Hoofddorp (NL); Laurens De Ruijter, Hoofddorp (NL); Eddy Dubbeldeman, Hoofddorp (NL); Caspar Titus Bolsman, Hoofddorp (NL)

(73) Assignee: Sonion Nederland B.V., Hoofddorp (NL)

( * ) Notice: Subject to any disclaimer, the term of this patent is extended or adjusted under 35 U.S.C. 154(b) by 105 days.

(21) Appl. No.: 18/251,286

(22) PCT Filed: Nov. 1, 2021

(86) PCT No.: PCT/EP2021/080261
§ 371 (c)(1),
(2) Date: May 1, 2023

(87) PCT Pub. No.: WO2022/090538
PCT Pub. Date: May 5, 2022

(65) Prior Publication Data

US 2023/0412994 A1 Dec. 21, 2023

(30) Foreign Application Priority Data

Nov. 2, 2020 (NL) ..................................... 2026806

(51) Int. Cl.
*H04R 25/00* (2006.01)
*H04R 1/28* (2006.01)
(Continued)

(52) U.S. Cl.
CPC ......... *H04R 25/656* (2013.01); *H04R 25/604* (2013.01); *H04R 1/2857* (2013.01);
(Continued)

(58) Field of Classification Search
CPC ...... H04R 2460/11; H04R 9/06; H04R 9/025; H04R 25/656; H04R 25/604; H04R 1/1041; H04R 1/2857
See application file for complete search history.

(56) References Cited

U.S. PATENT DOCUMENTS 10,917,731 B2 * 2/2021 Monti .................. H04R 25/402
2011/0129108 A1 * 6/2011 Miller ..................... F16K 3/246
381/322
2020/0288251 A1 9/2020 Kuipers

FOREIGN PATENT DOCUMENTS

EP 3471432 A1 4/2019

OTHER PUBLICATIONS

International Search Report for Internatinal Patent Application No. PCT/EP2021/080261 dated Jan. 21, 2022.
(Continued)

*Primary Examiner* — Sunita Joshi
(74) *Attorney, Agent, or Firm* — Harness, Dickey & Pierce, P.L.C.

(57) ABSTRACT

Acoustic valve for a hearing device, including a valve body defining a passageway, and a seat member and shutter member inside the valve body. The shutter member defines a shutter surface that forms a contact portion and a non-contact portion. The shutter member is moveable relative to the seat member to transition the valve between an opened state, wherein the shutter member is removed from the seat member and the passageway is open to allow sound to pass, and a closed state wherein the contact portion abuts the seat member and the non-contact portion blocks the passageway to restrict passage of sound. The contact portion forms a protruding structure that extends from the non-contact portion and towards the seat member, and has a small width along at least one transverse direction to minimise a contact
(Continued)

area between the contact portion and the seat member when the valve is closed.

15 Claims, 6 Drawing Sheets

(51) Int. Cl.
*H04R 9/02* (2006.01)
*H04R 9/06* (2006.01)

(52) U.S. Cl.
CPC ................ *H04R 9/025* (2013.01); *H04R 9/06* (2013.01); *H04R 2225/0216* (2019.05); *H04R 2460/11* (2013.01)

(56) References Cited

OTHER PUBLICATIONS

Internatinal Preliminary Report on Patentability for International Patent Application No. PCT/EP2021/080261 Dated Feb. 9, 2022.

* cited by examiner

DETAIL B
SCALE 40 : 1

ACOUSTIC VALVE, AND HEARING DEVICE INCLUDING SUCH AN ACOUSTIC VALVE

CROSS-REFERENCE TO RELATED APPLICATIONS

This application is a national phase under 35 U.S.C. § 371 of PCT International Application No. PCT/EP2021/080261 which has an International filing date of Nov. 1, 2021, which claims priority to Netherlands Patent Application No. 2026806, filed Nov. 2, 2020, the entire contents of each of which are hereby incorporated by reference.

TECHNICAL FIELD

The invention relates to an acoustic valve for a hearing device, and to a hearing device including such an acoustic valve.

BACKGROUND ART

In-ear hearing devices with acoustic valves that can be actuated between opened and closed states are known. In the closed state, the acoustic path between the ear canal and the outside world is acoustically sealed off, whereas in the open state, the acoustic path allows an ambient sound signal to pass into the ear canal. For instance, patent document EP3471432A1 describes sound elements that define acoustic channels and include acoustic valves that are switchable between opened and closed states. Such valve members can be actuated by a source that moves the valve member between states in response to receiving an actuation signal, for instance by a mechanical drive, or by changing magnetic or electric field.

A problem experienced with known hearing devices is that in higher humidity conditions, the likelihood that the acoustic valve fails to respond to actuation signals tends to increase. It would be desirable to provide a hearing device with an acoustic valve for which the switching between open and closed states proceeds in a more reliable and reproducible fashion, even under higher humid conditions.

SUMMARY OF INVENTION

Therefore, according to a first aspect of the invention, there is provided an acoustic valve for a hearing device as defined in claim 1. At least part of the hearing device, for instance a receiver housing, is adapted to be positioned inside an ear canal. The acoustic valve includes a valve body, a seat member, and a shutter member. The valve body defines a passageway that extends through the valve body. The seat member is arranged inside the valve body, and delimits part of the passageway. The shutter member is also arranged inside the valve body, and is moveable relative to the seat member to allow the acoustic valve to transition between closed and opened states. The shutter member forms a shutter surface that is directed towards the seat member and is composed of a contact portion and a non-contact portion. In the opened state of the acoustic valve, the shutter member is at a distance from the seat member, and the passageway is open so that sound is allowed to pass. In the closed state of the acoustic valve, the contact portion of the shutter surface abuts the seat member, and the non-contact portion of the shutter surface blocks the passageway so that sound through the valve is restricted. According to this first aspect, the contact portion of the shutter surface is formed as a protruding structure that extends relative to the non-contact portion and towards the seat member. This protruding structure has a small width along at least one transverse direction, to minimise a contact surface area between the shutter member (i.e. the contact portion of the shutter surface) and the seat member when the acoustic valve is in the closed state.

When a hearing device is used in an environment with high humidity (like the inside of an ear), water vapour may condense onto those portions of the hearing device that are at a lower temperature than the ambient air. This may for instance occur when a user inserts the hearing device into his/her ear canal directly after taking a shower, or when wearing the hearing device while doing sport. The inventors have discovered that, when a hearing device is used under such conditions, water droplets may condense onto portions of the acoustic valve in the device, and in particular on the shutter and/or seat members. Such droplets may eventually coalesce and form a thin film of water that extends across the shutter and/or seat surfaces. When the valve is in the closed state, this film may become trapped between the touching portions of the shutter and seat surfaces, so that the water molecules will exert boundary tension on these surfaces. The water film will act as a liquid bridge, generating an effective force—referred to as "capillary force"—between the touching surfaces, causing these surfaces to stick together temporarily. In the present types of in-ear hearing devices, the maximum force that the actuator of the acoustic valve is able to generate is quite low, typically in the order of several millinewton (mN) or less. If no further measures are taken, such small actuating force may be insufficient to overcome the capillary force exerted by the film. Therefore, in prior art hearing devices, the shutter member may remain temporarily stuck to the seat member, at least until the film has evaporated enough so that the capillary force will no longer exceed the valve actuation force.

In accordance with the first aspect, this problem is mitigated by providing the protruding structure at the shutter surface. This protruding structure has a small width along at least one transverse direction, to minimise the contact surface area between the shutter member and the seat member when the acoustic valve is in the closed state. This protruding structure forms a(t least one) standoff that holds the non-contact portion of the shutter surface at a distance from the seat surface when the acoustic valve is in the closed state. The non-contact portion of the shutter surface is adjacent to a part of the seat surface that extends radially inwards as seen with respect to the protruding surface. An advantage of such a seat surface that comprises a part that extends radially inwards with respect to the protruding structure is that the protruding structure does not require specific outlining with respect to the seat surface to be able to close against the seat surface. As seen in the transverse direction, the seat surface thus comprises a first part to which the protruding structure abuts in the closed state and a second part that extends radially inwards with respect to this first part. The seat surface may further comprise a third part that extends radially outwards with respect to the first part. The term "transverse direction" pertains one or both coordinate directions that span the surface area of the contact portion of the shutter member, so that this contact portion is thin along one or both of its transverse dimensions. The term "small width" refers herein to a transverse thickness of less than $1/20^{th}$ of a characteristic transverse dimension of the entire shutter surface, for instance less than $1/40^{th}$ or possibly even less than $1/60^{th}$ of the characteristic transverse dimension of the shutter surface. The presence of such a thin protruding structure at the shutter surface ensures that the area of the contact surface between the shutter member and the seat member in the closed state is minimised, so that capillary forces exerted by a trapped water film act only across a relatively small contact surface and will not exceed a maximum actuating force generated by the valve actuator. The resulting low capillary forces can be overcome by the valve actuator, without the need to supply additional power to the valve actuator.

In the present specification, term “hearing device” is used herein to refer generally to in-ear hearing aids, in-ear phones, earbuds, hearables, etc. The term “acoustic valve” refers herein to an element used for controlling the propagation of sound signals through an acoustic conduit that extends through the hearing device. Such a valve defines first and second apertures, which are interconnected by an internal passageway that can be selectively opened or obstructed to allow or restrict the passage of sound through the valve.

In this context, the “open” and “closed” states of the valve will depend on the operational characteristic of the hearing device that is to be controlled. When controlling sound levels, the passageway need not be hermetically sealed, as sound may be sufficiently attenuated even if the aperture still has a small opening. In the context of controlling sound, “open” and “closed” may be defined to a desired degree of sound attenuation and/or in relation to a minimum and maximum size of the aperture when closed or not closed by the closing element.

In an embodiment, a cross-sectional area of the contact portion defined along both transverse directions is at least one order of magnitude smaller than a total cross-sectional area of the shutter surface along the transverse directions.

For in-ear hearing devices, a characteristic transverse dimension (e.g. diameter) of the shutter surface may be in a range of 1.5 to 6 millimetres (mm). Alternatively or in addition, the protruding structure may extend with a height in a range of 10 to 100 micrometres (μm) relative the non-contact portion of the shutter surface.

In an embodiment, the seat member defines a seat surface that faces the shutter member. The shape of the contact portion of the shutter surface may be attuned to the shape of the seat surface, in order to fit snugly when the shutter surface abuts the seat member in the closed state of the valve. For instance, both the contact portion and the seat surface may define congruent shapes that span mutually parallel planes.

In an embodiment, the protruding structure extends in a closed loop along the shutter surface. The protruding structure may have a raised distal surface that forms the contact portion and that extends in a closed loop while spanning a plane. Similarly, the seat member may define a seat surface that spans a further plane that is parallel to the contact portion. This allows the contact portion to abut and form a sealing connection with the seat surface, when the valve is in the closed state.

The protruding structure may thus be formed as a thin wall that extends in a closed loop along the shutter surface. As a result, the contact area between the shutter member and the seat member in the closed state essentially forms a line contact, which provides good sound insulation performance in the closed state while being relatively insensitive to rotational misalignment between the shutter and seat surfaces. This rim may for instance form an annular ring that extends along the outer periphery of the shutter surface, and which entirely surrounds the non-contact portion of the shutter surface. This ring may define a top surface that forms a co-planar contact portion adapted to engage the valve seat in the closed state of the valve.

In alternative embodiments, the protruding structure is formed by one or more local protrusions, for instance one or more bumps or posts, arranged along an outer periphery of the shutter surface and extending at a height relative to the non-contact portion of the shutter surface. Such a protrusion is thin along both its transverse directions, in order to further minimise the contact surface area between the shutter member and the seat member. The height of each local protrusion relative to the non-contact portion may be in the order of 10 μm to 100 μm, and a characteristic width of each local protrusion along the direction of the shutter surface may also be in the order of 10 μm to 100 μm.

The local protrusions are preferably distributed in a regular arrangement along the outer periphery of the shutter surface, for instance at each corner of a polygonal shutter surface or at essentially identical mutual arc lengths along the periphery of a circular shutter surface. Providing the local protrusions along the outer periphery of the shutter surface ensures that the non-contact portion of the shutter surface is laterally surrounded by these protrusions, thus maximising available surface area for covering the through hole provided in the seat member, while stabilising the orientation of the shutter member relative to the seat member in the closed state.

In an embodiment, the seat member extends in a closed loop along an inner wall of the valve body and defines a through hole that is aligned with the passageway of the valve body. The shutter surface may be bounded by an outer periphery that spans and covers at least a cross-sectional shape of the through hole, and the protruding structure may be provided directly along the outer periphery of the shutter surface.

Providing the protruding structure along the outer periphery of the shutter surface ensures that essentially the entire non-contact portion of the shutter surface is surrounded by the protruding structure. This maximises the surface area available for covering the through hole in the seat member and thus maximises the effective aperture size in the opened state as compared to the closed state of the valve.

The protruding structure may for instance form a continuous rim—for instance an annular rim—that protrudes in axial direction towards the seat surface and extends uninterruptedly along the outer periphery of the shutter surface.

In an embodiment, the non-contact portion of the shutter surface defines a recessed structure that is arranged directly adjacent to the protruding structure, viewed in a transverse cross-section of the shutter member. This recessed structure may include multiple depth levels. Each or all of the depth levels may also extend in a closed loop along the shutter surface.

The recessed structure provided right next to the protruding structure serves to control the flowing direction of water droplets that have condensed onto the shutter surface. The height transition between two adjacent depth levels forms a barrier that prevents water droplets from flowing closer towards the protruding structure. Each height transition forms an additional surface area onto which water droplets can adhere to form a local meniscus. This helps to reduce the likelihood that water droplets condensed on the shutter surface will merge and form a water film that holds together the touching surfaces of the valve and seat members.

In a further embodiment, a local height of the recessed structure relative to a height of the protruding structure decreases monotonically as function of increasing lateral distance from the protruding structure to form a staircase profile.

Here, the recessed structure forms an inwards receding staircase profile for increasing inwards distances away from the protruding structure. The deviation between the local surface temperature and the ambient temperature may be more significant closer towards the centre of the shutter surface. Due to the staircase profile, the resistance to flow of water droplets towards the protruding structure becomes increasingly larger for droplets that have formed closer to the centre of shutter surface. The staircase profile may continue to recede for progressing lateral distance values away from the protruding structure up to the centre of the shutter surface, or may alternatively recede only across a finite continuous range of lateral distance values away from the protruding structure. The recessed structure may form a concentric profile of mutually varying depth levels, for instance a concentric pattern of continuous annular depressions. In addition, the recessed structure may be arranged concentric with and inwards relative to the protruding structure.

In an alternative embodiment, the non-contact portion of the shutter surface defines a smoothly curved concave upwards profile as function of increasing lateral distance from the protruding structure. At the interface with the contact portion, the decreasing profile may be oriented at a non-zero angle relative to a contact surface of the seat member.

In this embodiment, the recessed structure forms a profile that gradually recedes downwards (i.e. decreases strictly) for increasing inwards distances away from the protruding structure, such that the shutter surface terminates in a contact portion that is tilted relative to a surface of the seat member. Due to the non-zero local angle between the seat surface and the shutter surface near the contact portion in the closed state of the valve, any water film trapped between these interface surfaces will form a meniscus that has a non-zero local wetting angle relative to the interface surfaces, which in turn yields a lower capillary contraction force between these surfaces.

In an embodiment, at least one of the shutter surface and the seat surface is provided with a coating that consists essentially of a hydrophobic material.

By providing either one or both of the shutter surface and seat surface with a hydrophobic coating layer, the tendency of the condensed water droplets to adhere to these surfaces will be lowered, which in turn significantly reduces the sticking forces due to the capillary effect between these surfaces when they are touching in the closed state of the valve.

In an embodiment, the shutter member is moveable relative to the seat member along an actuation direction, the actuation direction being linear and essentially perpendicular to the contact portion of the shutter surface and to the seat surface.

In an embodiment, the seat member and the shutter member define respective central through holes that are mutually aligned and through which a tube with an acoustic channel of the hearing device passes, the channel connecting a side of the acoustic valve that is closer to an acoustic transducer of the hearing device to an opposite side of the acoustic valve that is closer to an acoustic output aperture of the hearing device. The shutter member may be slidingly moveable along the tube and relative to the seat member to transition the acoustic valve between the opened and closed states without obstructing the acoustic channel.

In embodiments, the passageway has a cylindrical or rectangular cross-sectional shape that is centred on the axis. The seat member may then form a circular or rectangular annular body that surrounds the passageway from transverse directions, and the protruding structure may then be formed as a circular or rectangular annular rim that protrudes from the remainder of the shutter surface in axial direction towards the seat surface.

In an embodiment, the shutter member with the protruding structure and the recessed structure are formed as a continuous unitary body, for instance using casting or moulding techniques.

In an embodiment, the shutter member is moveable relative to the seat member along an actuation direction, and the shutter member incorporates a permanent or switchable magnet, the magnet having a magnetic dipole moment that is essentially aligned with the actuation direction of the shutter member.

In an embodiment, the acoustic valve comprises a further seat member, and the shutter member further defines a rear surface that is directed towards the further seat member. In the opened state of the acoustic valve, the shutter member may abut the further seat member, whereas in the closed state of the acoustic valve, the shutter member may be at a distance from the further seat member. This rear surface may include at least one further protruding structure that extends relative to the rear surface and towards the further seat member, and which has a small further width along at least one of the transverse directions, to minimise a further contact surface area between the shutter member and the further seat member when the acoustic valve is in the opened state. The provision of such further protruding structures is itself believed to be inventive in and of its own right in the present context, and may be subject of a divisional application.

In a second aspect of the invention, and in accordance with the advantages and effects described herein above, there is provided a hearing device with a receiver housing that is adapted to be placed in an ear canal. The receiver housing comprises an acoustic transducer, and acoustic channel, a valve passageway, and an acoustic valve according to the first aspect. The acoustic transducer is configured to generate an acoustic output signal based on a received electric input signal, which may for instance originate from a microphone. The acoustic channel has an outlet for conveying the acoustic output signal from the acoustic transducer towards an eardrum located in an inner region of the ear canal. The valve passageway forms an interconnection between a first aperture and one or more second apertures that is/are defined on distinct portions of the receiver housing. The outlet of the acoustic channel discharges into the passageway. The passageway is adapted to allow or prevent ambient sound to propagate from an outer region of the ear canal, via the apertures and passageway, to the inner region of the ear canal, when the valve is the opened state or closed state.

BRIEF DESCRIPTION OF DRAWINGS

Embodiments will now be described, by way of example only, with reference to the accompanying schematic drawings in which corresponding reference symbols indicate corresponding parts. In the drawings, like numerals designate like elements. Multiple instances of an element may each include separate letters appended to the reference number. For example, two instances of a particular element "48" may be labelled as "48*a*" and "48*b*". The reference number may be used without an appended letter (e.g. "48") to generally refer to an unspecified instance or to all instances of that element.

The figures are meant for illustrative purposes only, and do not serve as restriction of the scope or the protection as laid down by the claims.

DESCRIPTION OF EMBODIMENTS

The following is a description of certain embodiments of the invention, given by way of example only and with reference to the figures.

Figure 1A:
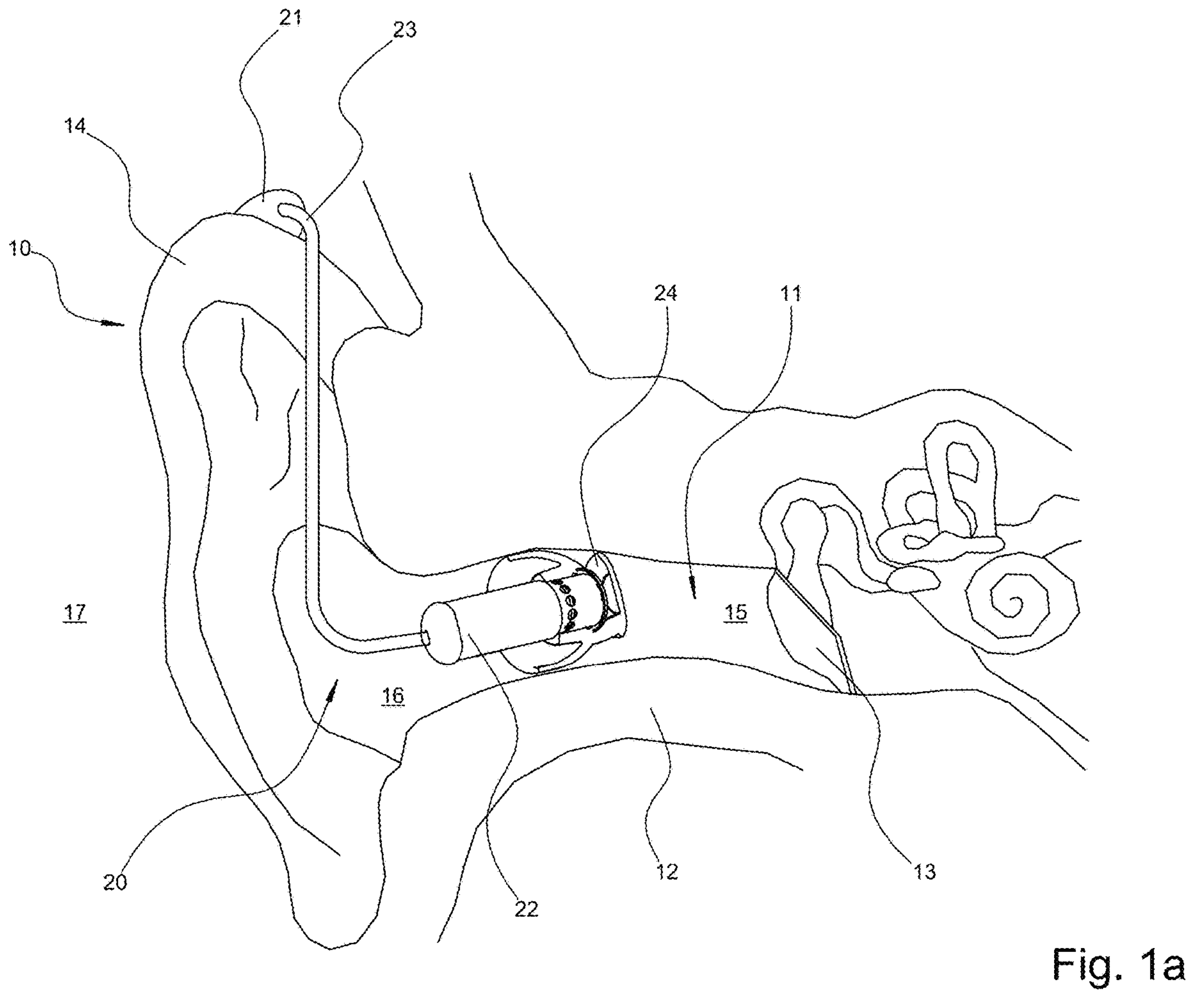
FIGS. 1*a-b* schematically show perspective views of a hearing device according to an embodiment.

FIG. 1*a* schematically shows a perspective view of a hearing device 20 according to an embodiment, of which part 22 is positioned inside an ear canal 11 of a human ear 10 (shown in cross-section). The ear canal 11 is bounded in radial directions by a wall 12, terminates on an inner distal end at an eardrum 13, and opens at an outer distal end into an opening of the auricle 14.

The exemplary device 20 in of FIG. 1*a* represents a hearing aid device 20 with a receiver-in-canal (RIC) configuration, which comprises a microphone housing 21 that is positionable behind the auricle 14, and a receiver housing 22 that is positionable inside the ear canal 11. In an operational state, this receiver housing 22 is connected via a thin flexible wire 23 to microphone housing 21.

The microphone housing 21 accommodates a microphone, amplifier, and signal processing components of the hearing device 20. These components cooperate to generate the electrical source signal, which is transmitted via the wire 23 to the receiver housing 22.

Figure 1B:
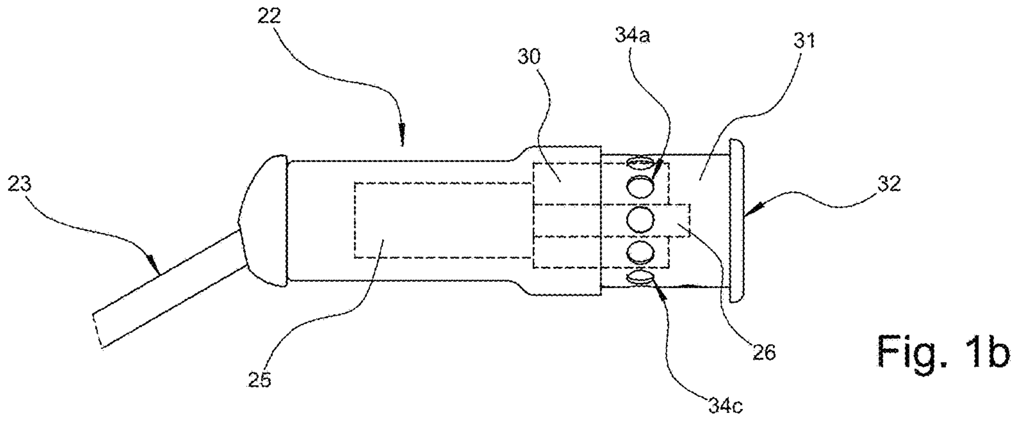

FIG. 1*b* shows a perspective view of the receiver housing 22 from FIG. 1*a*. This schematically illustrates that the receiver housing 22 accommodates an acoustic transducer 25 (i.e. the speaker or acoustic transducer for emitting sound), which is configured to transform the electric source signals received from the components in the microphone housing 21 into an acoustic signal. The receiver housing 22 encloses a tube that internally defines an acoustic channel 26, which is adapted to convey the sounds generated by the transducer 25 further into the ear canal 11 towards the eardrum 13. The receiver housing 22 further includes an acoustic valve 30, and a valve actuator (not indicated). The wire 23 extends from a first distal end of the receiver housing 22. The opposite distal end of the receiver housing 22 defines a first aperture 32, being an acoustic output aperture 32 for emitting sound signals generated by the hearing device 20, as well as a flange for holding a plug member 24.

FIG. 1*a* illustrates that the plug member 24 can be attached at one distal end of the receiver housing 22, in such a way that this plug member 24 surrounds the first aperture 32 provided in the receiver housing 22 without obstructing this first aperture 32. The plug member 24 is shaped as a dome, which has a radius that approximates a local radius of the ear canal 11, and which is made of a flexible material to allow the plug member 24 to conform to and establish a seal with the local contour of the canal wall 12. The sealing engagement between the plug member 24 and the canal wall 12 (indicated by dashed lines) divides the ear canal 11 into an inner region 15 upstream of the plug member 24 that is closer to the eardrum 13, and an outer region 16 downstream of the plug member 24 that is closer to the ambient 17.

Figure 2:
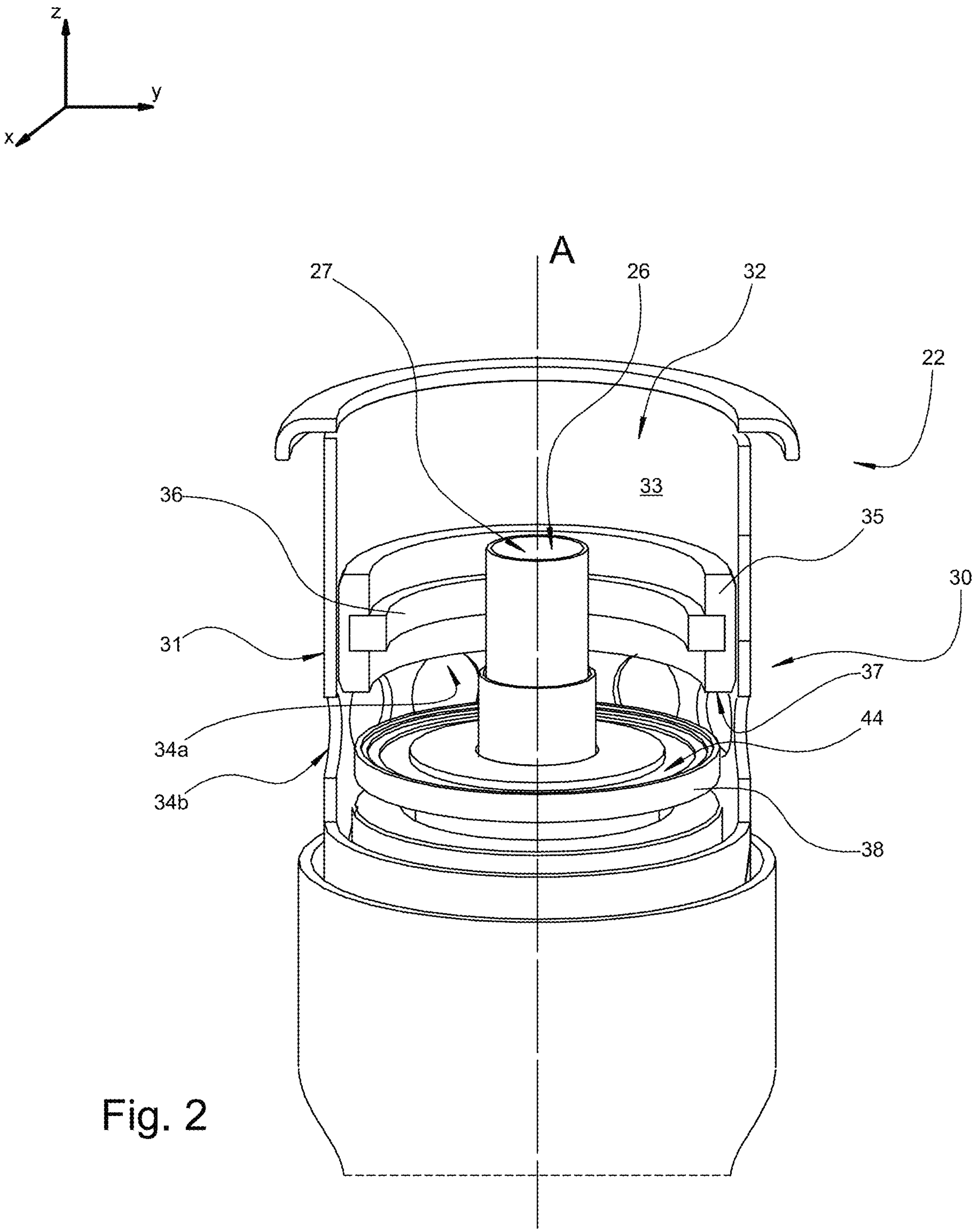
FIG. 2 schematically shows a partially cut-away view of the hearing device from FIGS. 1*a-b;*

FIG. 2 shows a perspective view of a top part of the receiver housing 22 from FIGS. 1*a-b*, in which a front portion of the outer surface has been schematically cut away to illustrate details of the acoustic valve 30 accommodated inside.

The acoustic valve 30 comprises a valve body 31, a seat member 35, and a shutter member 38. The valve body 31 encloses a passageway 33 from transverse radial directions, and accommodates the seat member 35 and the shutter member 38. In this example, the valve body 31, passageway 33, seat member 35, and shutter member 38 are all centred on a nominal axis A.

The valve body 31 defines the first aperture 32 at a first distal end that faces in an axial direction Z along axis A, and a plurality of second apertures 34*a*, 34*b*, 34*c* in/through a radial side surface of the valve body 31. In this example, the second apertures 34 have curved circular shapes, and open up in radially outwards directions away from axis A. When the hearing device 20 is in an operational in-ear position (FIG. 1*a*), first aperture 32 will be facing towards the eardrum 13 in the inner region 15 of the ear canal 11, whereas the second apertures 34 will be facing radially outwards towards canal wall 12, at positions slightly downstream of the plug member 24.

Figure 4A:
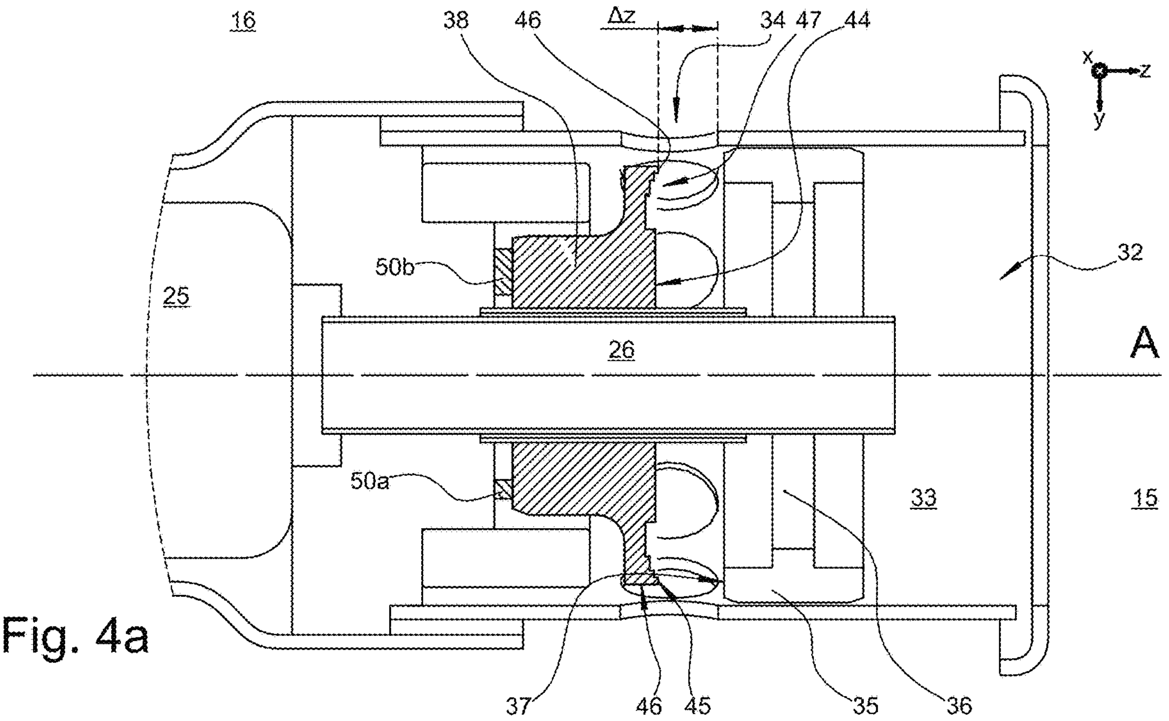
FIGS. 4*a-b* schematically show cross-sectional views of part the hearing device from FIGS. 1*a*-2.

The passageway 33 interconnects the first aperture 32 with the second apertures 34, so that air is allowed to move between the inner and outer regions 15, 16 of the ear canal 11, at least when the valve 30 is in the opened state (as shown in FIGS. 2 and 4*a*).

In this example, each of the acoustic channel 26 and the valve passageway 33 has a cylindrical shape that is centred on axis A. Here, passageway 33 and acoustic channel 26 are concentrically arranged, with passageway 33 having a larger radius than and surrounding the acoustic channel 26. As a result, sound signals produced by the acoustic transducer 25 need to travel along the path that is defined in sequence by the acoustic channel 26 in upstream direction and passageway 33 in downstream direction, before these sounds can propagate via the outer region 16 of the ear canal 11 and reach the ambient 17.

In this example, the seat member 35 forms a toroidal body that is also centred on the axis A, and is fixed to the inner wall of valve body 31 at an axial position that is located between the second apertures 34 on one side, and the first aperture 32 on the opposite side. A through hole 36 extends completely through this seat member 35, and is also centred on axis A, in such a way that the inner wall of the seat member 35 that delimits through hole 36 forms a continuation of passageway 33. The seat member 35 defines a seat surface 37, which has a flat annular shape that faces in the (negative) axial direction −Z towards the shutter member 38, and which is located at an axial position directly above the second apertures 34.

The shutter member 38 is arranged inside valve body 31, and forms a body with a rotational symmetry about axis A. This shutter member 38 is moveable back and forth parallel to axial direction Z and relative to valve body 31 and seat member 35, to allow the valve 30 to transition between opened and closed states. In this example, the actuation directions are linear and coincide with the positive and negative directions along the nominal axis A.

Figure 3B:
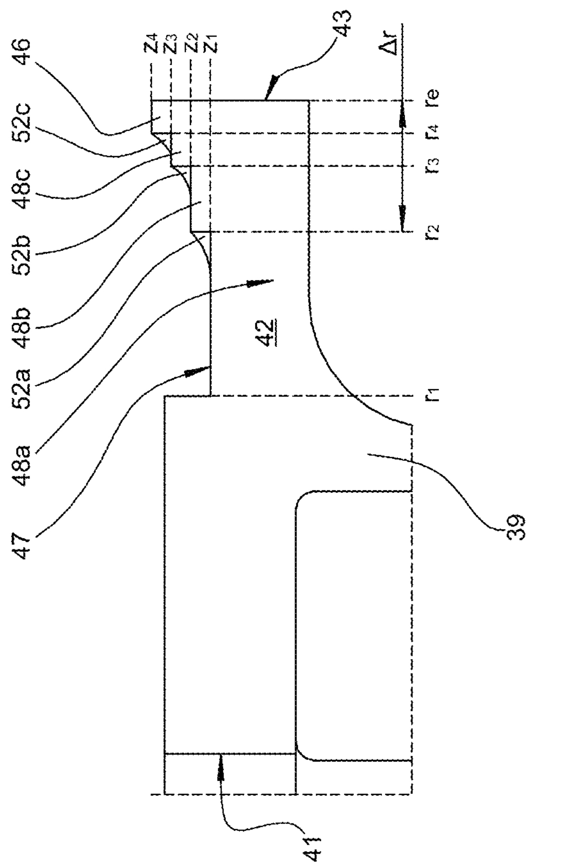
FIGS. 3*a-b* schematically show cross-sectional views of a shutter member in an acoustic valve as may be used in the hearing device of FIGS. 1*a*-2.
Figure 3A:
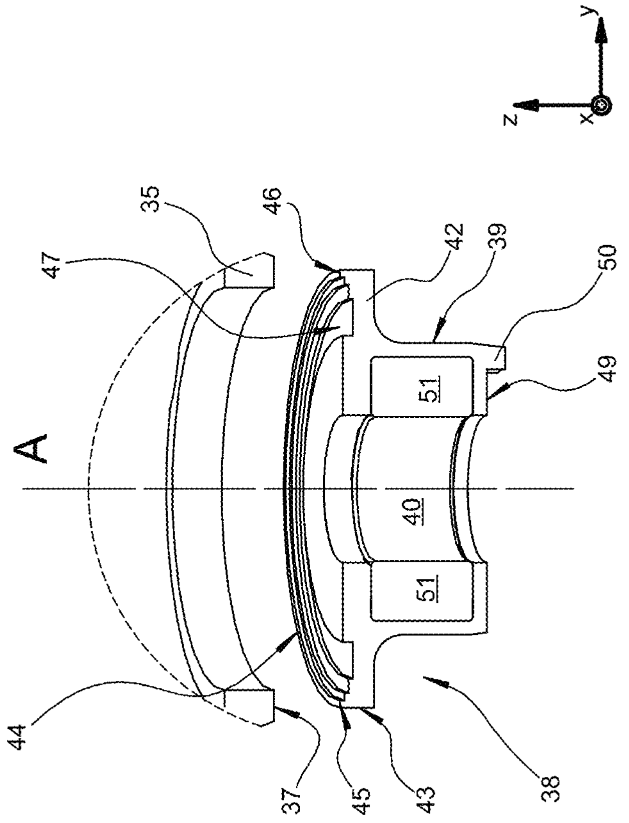

FIG. 3*a* shows a perspective and cross-sectional view of shutter member 38, with the cross-section taken along a radial-axial RZ-plane.

This shutter member 38 defines a main body 39 and a flange 42. The main body 39 has a further through hole 40 that extends in axial direction Z entirely through a centre region of this main body 39, so that both the body 39 and the further through hole 40 are centred on axis A. The flange 42 protrudes radially outwards relative to this body 39 and towards both transverse directions X and Y. This main body 39 and flange 42 jointly define a shutter surface 44 on one distal axial end of the shutter member 38. In this example, the shutter surface 44 forms an annular disc, which is provided with surface structures 46, 48, and which faces generally in the (positive) axial direction Z towards the seat surface 37.

In radial outward directions, the flange 42 and shutter surface 44 are bounded by an outer periphery 43. Along this periphery 43, surface 44 includes a protruding structure 46 that protrudes in the positive axial direction+Z towards the seat surface 37, and relative to the lower lying remainder of the surface 44. This height difference conceptually divides surface 44 into, on the one hand, a contact portion 45 corresponding with the small upper surface of the protruding structure 46 that directly engages the seat surface 37 in the closed state, and on the other hand, a non-contact portion 47 that entirely covers the cross-sectional shape of the through hole 36 in the closed state.

The projecting shape of the protruding structure 46 ensures that the non-contact portion 47 of the shutter surface 44 always remains spaced from the seat surface 37, also in the closed state. In this example, the protruding structure 46 forms an annular rim that extends in a continuous manner along the outer periphery 43 of the shutter surface 44. This protruding structure 46 has a small width along the radial direction (i.e. either one of the transverse directions X, Y starting from axis A), so that the annular surface area defined by the contact portion 45 is relatively small compared to the area of the entire shutter surface 44. This ensures that the surface area of the interface between the shutter member 38 and the seat member 35 when the acoustic valve 30 is closed, will be minimal.

Directly adjacent to the protruding structure 46, the shutter surface 44 defines a recessed structure 48, which forms a circular concentric profile that recedes step-wise downwards (axially inwards) as function of increasing lateral distance Δr from the protruding structure 46 and inwards towards central axis A. The concentric pattern of stepwise monotonically decreasing levels 48*a*, 48*b*, 48*c* forms an annular staircase profile, wherein each level 48*a-c* is at a different height $z_3$, $z_2$, $z_1$, and wherein each pair of adjacent levels 48*a-c* is interconnected by a vertical (cylindrical) wall at respective distances $r_4$, $r_3$, $r_2$ from the outer periphery 43. The resulting radial sequence of depth levels 48*a-c* act as barriers that prevent water droplets on the non-contact portion 47 from flowing towards the protruding structure 46. Each vertical transition between depth levels 48*a-c* presents an additional surface area onto which the droplets can adhere and form a local water meniscus 52*b*, 52*c* (FIG. 3*b*).

Figure 4B:
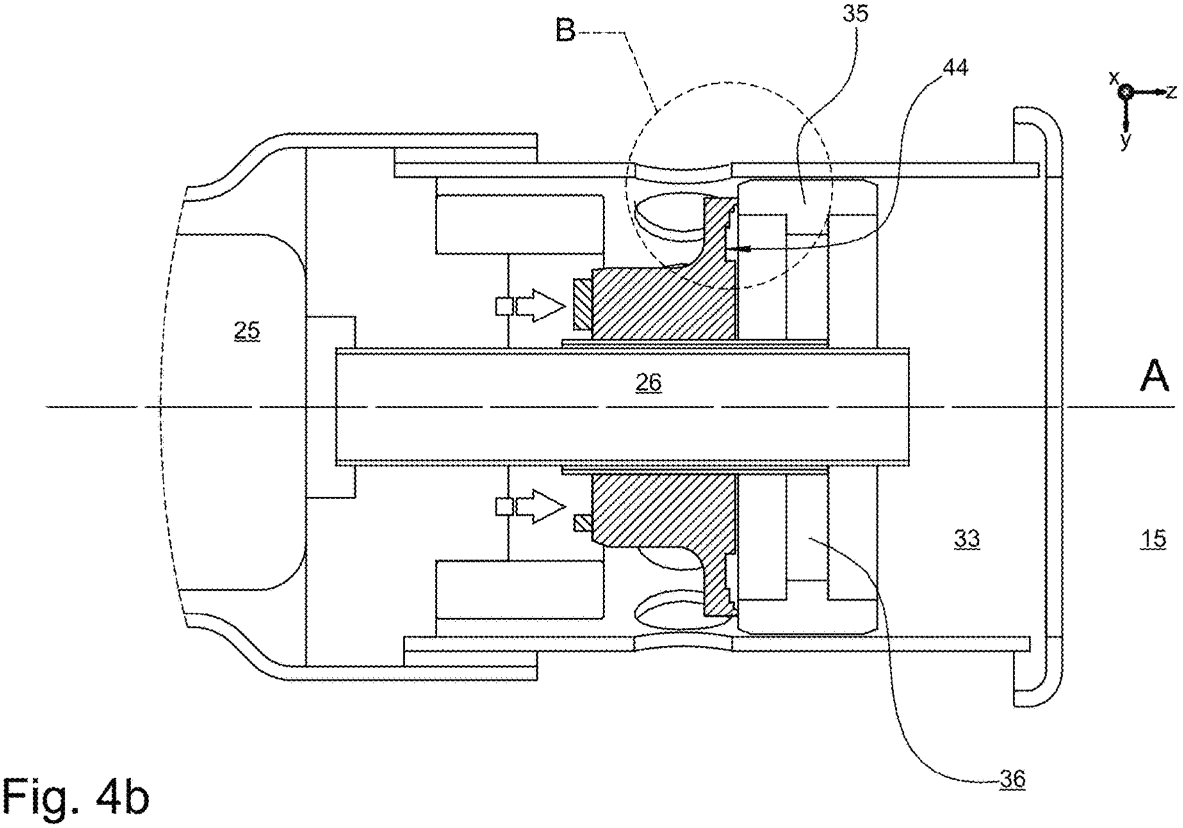

FIGS. 4*a*-4*b* show cross-sectional views of the receiver housing 22 of FIGS. 1*b*-2 in distinct operational states, with FIG. 4*a* showing the acoustic valve 30 in an opened state, and FIG. 4*b* showing the acoustic valve 30 in a closed state. A detail of FIG. 4B is also shown.

In this example, the valve actuator includes an adjustable magnetic field source with a coil of electrically conducting wire that is fixed relative to the valve body 31 and supplied with electric currents by actuator controller (not indicated), as well as a permanent or switchable magnet 51 that is embedded in the body 39 of the shutter member 38 (FIG. 3*a*). Energising the EM-coil with current from the controller will generate a magnetic field that is sufficiently strong to interact with the magnet 51 in shutter member 38, resulting in a net force acting on shutter member 38 that will cause it to translate relative to the valve body 31 and valve seat 35.

In the opened state (FIG. 4*a*), the shutter member 38 is at a non-zero distance Δz away from the seat member 35. This distance Δz almost equals the height of the second apertures 34, so that shutter member 38 obstructs second apertures 34 only to a minor extent, and that passageway 33 and through hole 36 remain sufficiently free to allow air and sound to pass from outer region 16 to inner region 15 of the ear canal 11, and vice versa.

Figure 4C:
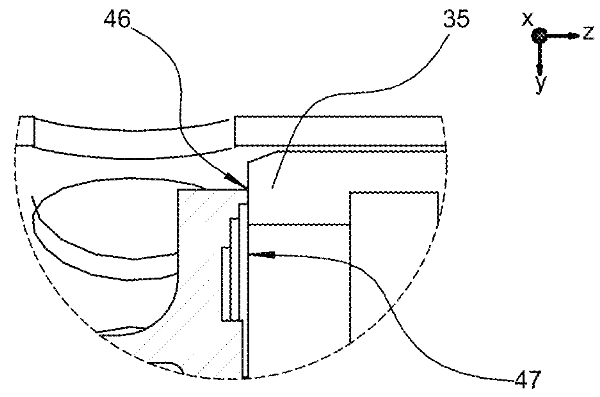

In the closed state (FIG. 4*b* and the detail thereof, FIG. 4*c*), the contact portion 45 on the protruding structure 46 abuts the seat surface 37, so that the shutter surface 44 completely covers the passageway 33 and the through hole 36. In this state, the second apertures 34 are disconnected from the passageway 33, so that ambient air and sound can no longer pass through passageway 33 towards the inner region 15, and so that sound from the acoustic transducer 25 can no longer pass towards the ambient 17. From FIG. 4*b* and the detail thereof, FIG. 4*c*, which detail shows the area where the protruding structure 46 abuts the seat surface 37 of seat member 35, it is also clear that the seat surface 37 extends both radially outwards and inwards with respect to the protruding structure 46 such that no specific alignment of the protruding structure 46 with respect to the seat surface 37 of the seat member 35 is required.

The radial extent $r_e$-$r_a$ of contact portion 45 is very small (FIG. 3*b*), which ensures that the extent of surface overlap between the shutter member 38 and the seat member 35 in the closed state is small. In damp ambient conditions, a water film may temporarily form through vapour condensation on the seat surface 37, on the shutter surface 44, or on both. The small surface overlap ensures that capillary forces exerted by the water film on/between the touching surfaces 45, 37 will remain lower than the maximum actuation force of 1.5 to 3 mN that can be exerted by the valve actuator. In this example the radial extent $r_e$-$r_a$ is in the order of 10 μm to 100 μm, and the amount of overlap between surfaces 37 and 45 in the closed state is in the order of 0.1 mm 2 to 1 $mm^2$.

In this example, a rearward surface 49 of the shutter member 38 is provided with additional protrusions, which in this case are formed by three cams 50 that are regularly distributed along the circular rear surface 49 of the shutter member 38. These three cams 50 form standoffs that similarly minimise the amount of overlap between the shutter member 38 and a contacting surface of a further valve seat 54 that supports the shutter member 38 from the rear, when the valve 30 is in the opened state. The presence of the cams 50 on the rear surface 49 similarly minimise a contact area and reduces capillary forces from water trapped between the shutter member 38 and the further valve seat 54, when the acoustic valve 30 is in the opened state (FIG. 4*a*). In this case, the cams 50 do not need to extend along a continuous loop on the rear side 49 of the shutter member 38, because a sealing engagement between the shutter member 38 and the further valve seat 54 in the open state of the valve 30 is not required. However, in alternative embodiments, any or all features and effects discussed with reference to the protruding structures and recessed structures provided on the shutter surface, may also be implemented on the rear surface 49 of the shutter member 38.

Figure 5:
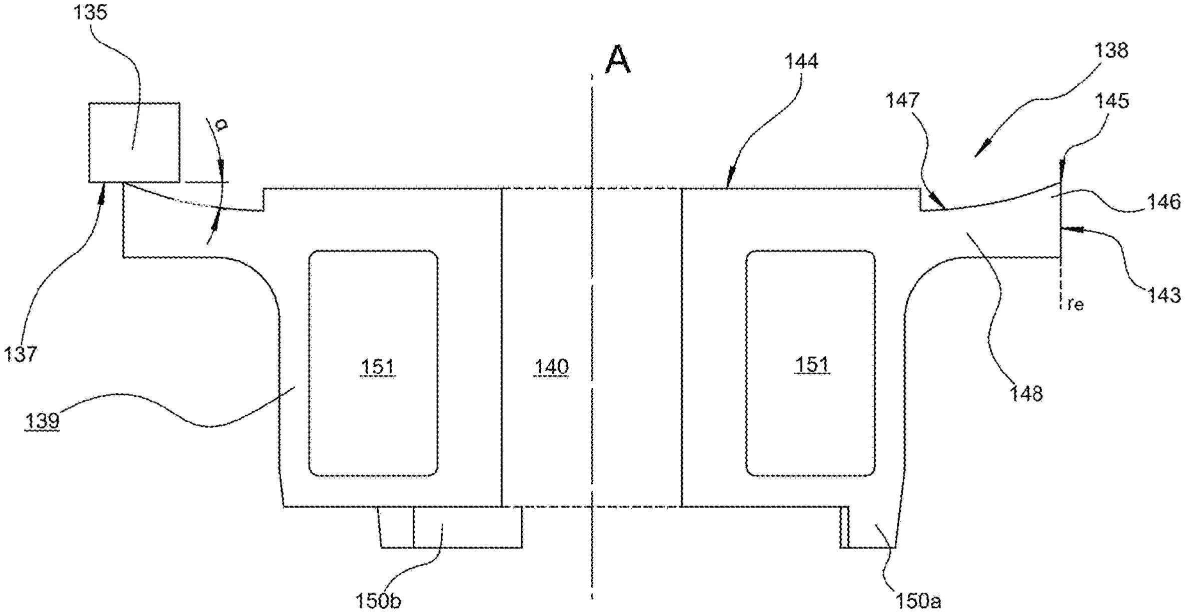
FIG. 5 schematically shows a cross-sectional view of a shutter member from an acoustic valve in another embodiment, and FIG. 6 schematically shows a cross-sectional view of a shutter member from an acoustic valve in yet another embodiment.

FIG. 5 shows a cross-sectional view of a shutter member 138, according to another valve embodiment. Features in the shutter member and valve that have already been described above with reference to the previous embodiments in FIGS. 1*a*-4*b* may also be present in the shutter member 138 shown in FIG. 5, and will not all be discussed here again. Like features are designated with similar reference numerals preceded by 100, to distinguish the embodiments.

In this example, the shutter surface 144 is formed with a concave upwards shape that has a smoothly curved monotonically decreasing profile 147 as function of radially inwards position relative to the protruding structure 146 along the outer periphery of the shutter surface 144. As a result, the protruding structure 146 that extends along the outer periphery of the shutter surface 144 forms a relatively sharp edge with a very small transverse cross-sectional area 145.

This contact area 145 continues into the non-contact area 147 to form a tilted surface region that is oriented at a non-zero angle α relative to the contact surface 137 of the seat member 135. Due to the non-zero local angle α between the touching surfaces 145, 137 in the closed state of the valve, a water film trapped between these touching surfaces 145, 137 will exert a lower capillary force between these surfaces 145, 137, compared to the situation where the surfaces are parallel (e.g. in FIG. 3*a*).

Figure 6:
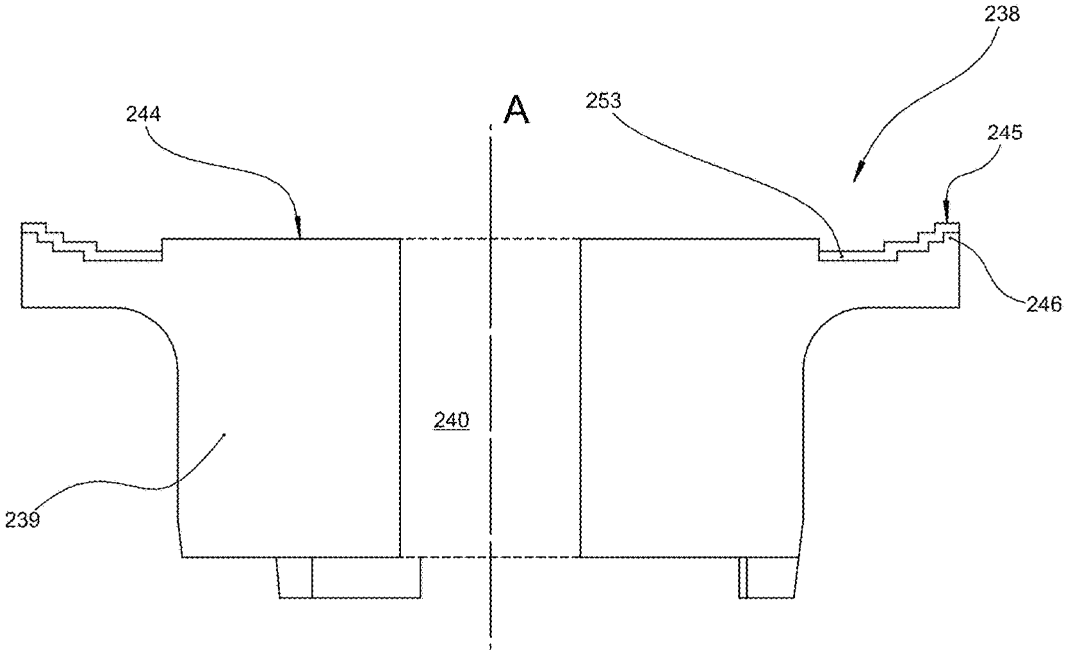

FIG. 6 shows a cross-sectional view of a shutter member 238 according to another embodiment. Features in the embodiments discussed with reference to FIGS. 1*a*-5) may also be present in shutter member 238, and will not all be discussed again. Like features are indicated with similar reference numerals preceded by 200.

In this example, the shutter surface 244 is provided with a coating 253 that consists essentially of a hydrophobic material. The portion of the coating 253 located on top of the protruding structure 246 will form a hydrophobic contact portion 245, which cause a water film trapped between the contact portion 245 and seat surface (e.g. element 37 in FIG. 3*a*) to form an outwards bulging meniscus directly above this contact portion 245, so that the capillary force on this portion 245 will become negative (i.e. directed outward). In addition, the portion of the coating 253 located on top of the non-contact portion of the shutter surface 244 will prevent water droplets from adhering to this surface and forming a film.

In further or alternative embodiments, the hydrophobic properties of the shutter surface may be achieved by providing micro patterning on this shutter surface.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. It will be apparent to the person skilled in the art that alternative and equivalent embodiments of the invention can be conceived and reduced to practice. All changes which come within the meaning and range of equivalency of the claims are to be embraced within their scope.

In the embodiments described with reference to the figures, the hearing device was a RIC-type hearing aid. In alternative embodiments, the hearing device may also be formed as a receiver-in-the-ear (RITE) hearing aid, a hearable, an in-ear phone, an earbud, or the like. It will be appreciated that the receiver need not be accommodated remote from audio signal reception components, signal processing components, and/or device controller components. Instead, some or all of these components may also be jointly accommodated in the same housing, which is placeable in the ear and/or inside the ear canal.

In the above exemplary embodiments, the shutter element was translatable relative to a nominal body axis corresponding with the longitudinal direction of the sound channel, to transition the acoustic valve between the opened and closed states. In alternative embodiments, the motion of the shutter element during the transitioning between states may proceed in different manners, such as by radial translation (i.e. perpendicular to the axis), by rotation, by helical motion (i.e. simultaneous translation and rotation), or simultaneous or sequential combinations thereof.

In the exemplary embodiments, the valve body, shutter member, and seat member were formed as bodies with discrete or continuous rotational symmetries about a common central (nominal) axis. It will be understood that alternative valve embodiments can be conceived that include a valve body, shutter member, and/or seat member with other shapes and/or symmetries.

In the exemplary embodiments, the shutter member, seat member, valve passageway, apertures, and acoustic channel were arranged in a coaxially aligned manner. In alternative embodiments, the acoustic valve with protruding structure according to the first aspect may be positioned in different locations and/or orientations relative to the valve passageway, the apertures, and/or the acoustic channel. Several examples of such different positions/orientations are illustrated in patent documents EP3471433A2 and EP3471432A1, which are herein incorporated by reference.

Note that for reasons of conciseness, the reference numbers corresponding to similar elements in the various embodiments (e.g. elements 138, 238 being similar to element 38) have been collectively indicated in the claims by their base numbers only i.e. without the multiples of hundreds. However, this does not suggest that the claim elements should be construed as referring only to features corresponding to base numbers. Although the similar reference numbers have been omitted in the claims, their applicability will be apparent from a comparison with the figures.

The present disclosure further relates to the embodiments reflected in the following clauses, which may be subject of a divisional application.

Clause 1: An acoustic valve 30 for a hearing device 20, at least part of the hearing device 20 being adapted to be positioned inside an ear canal 11. The acoustic valve 30 includes a valve body 31, a further seat member 54, and a shutter member 38. The valve body 31 defines a passageway 33 that extends through the valve body 31. The further seat member 54 and the shutter member 38 are arranged inside the valve body 31, with the shutter member 38 being moveable relative to the further seat member 54 to allow the acoustic valve to transition between closed and opened states. The shutter member 38 defines a rear surface 49 that is directed towards the further seat member 54. In the opened state of the acoustic valve 30, the shutter member 38 abuts the further seat member 54, and the passageway 33 is open so that sound is allowed to pass. In the closed state of the acoustic valve 30, the shutter member 38 is at a distance from the further seat member 54, and blocks the passageway 33 so that passage of sound through the valve 30 is restricted. According to this further aspect, the rear surface 49 of the shutter member 38 includes at least one further protruding structure 50 that extends relative to the rear surface 49 and towards the further seat member 54. This further protruding structure 50 has a small width along at least one transverse direction, to minimise a contact surface area between the shutter member 38 and the further seat member 54 when the acoustic valve 30 is in the opened state.

Advantages and effects of the protruding structure(s) are similar as described herein above with reference to the first aspect.

Clause 2: The acoustic valve 30 according to clause 1, wherein the at least one further protruding structure is formed by at least three cams 50, arranged along the rear surface 49 in a regular pattern and at similar mutual angular interspacings.

The invention claimed is:

1. An acoustic valve for a hearing device, at least part of the hearing device being adapted to be positioned inside an ear canal, the acoustic valve comprising:

a valve body defining a passageway extending through the valve body, the valve body defining a first aperture at a first distal end in an axial direction, and a plurality of second apertures in a radial side surface of the valve body;

a seat member arranged inside the valve body, and delimiting part of the passageway;

a shutter member arranged inside the valve body, and defining a shutter surface that is directed towards the seat member and is composed of a contact portion and a non-contact portion, the shutter member being moveable relative to the seat member to transition the acoustic valve between:

an opened state, wherein the shutter member is at a distance from the seat member, and the passageway is open to allow sound to pass, and a closed state, wherein the contact portion of the shutter surface abuts the seat member, and the non-contact portion of the shutter surface blocks the passageway to restrict passage of sound therethrough;

wherein a permanent or switchable magnet is embedded in a body of the shutter member, and in that the contact portion of the shutter surface is formed as a protruding structure that extends relative to the non-contact portion and towards the seat member, the protruding structure having a small width along at least one transverse direction to minimise a contact surface area between the contact portion and the seat member when the acoustic valve is in the closed state.

2. The acoustic valve according to claim 1, wherein a cross-sectional area of the contact portion is at least one order of magnitude smaller than a total cross-sectional area of the shutter surface.

3. The acoustic valve according to claim 1, wherein the seat member defines a seat surface that faces the shutter member, and wherein the shapes of the contact portion of the shutter surface and the seat surface are attuned to each other in order to fit snugly when the shutter surface abuts the seat member in the closed state.

4. The acoustic valve according to claim 1, wherein the protruding structure extends in a closed loop along the shutter surface, the protruding structure having a raised distal surface forming the contact portion.

5. The acoustic valve according to claim 4, wherein in the seat member defines a seat surface that spans a further plane that is parallel to the contact portion;

and wherein the contact portion sealingly abuts the seat surface in the closed state.

6. The acoustic valve according to claim 1, wherein the seat member extends in a closed loop along an inner wall of the valve body, and defines a through hole that is aligned with the passageway of the valve body.

7. The acoustic valve according to claim 6, wherein the shutter surface is bounded by an outer periphery that spans and covers at least a cross-sectional shape of the through hole in the closed state.

8. The acoustic valve according to claim 1, wherein the non-contact portion of the shutter surface defines a recessed structure arranged directly adjacent to the protruding structure, viewed in a transverse cross-section of the shutter member;

and wherein the recessed structure includes multiple depth levels.

9. The acoustic valve according to claim 8, wherein a local height of the recessed structure decreases monotonically relative to a height of the protruding structure as function of increasing lateral distance from the protruding structure, to form a staircase profile.

10. The acoustic valve according to claim 1, wherein the non-contact portion of the shutter surface defines a smoothly curved concave upward profile as function of increasing lateral distance from the protruding structure.

11. The acoustic valve according to claim 1, wherein at least one of the shutter surface and the seat surface is provided with a coating that consists essentially of a hydrophobic material.

12. The acoustic valve according to claim 1, wherein the shutter member is moveable relative to the seat member along an actuation direction, the actuation direction being linear and essentially perpendicular to the contact portion of the shutter surface.

13. The acoustic valve according to claim 1, wherein the passageway has a cylindrical or rectangular cross-sectional shape that is centred on a nominal axis;

wherein the seat member forms an circular or rectangular annular body that surrounds the passageway from transverse directions and defines a seat surface that faces the shutter member;

and wherein the protruding structure on the shutter surface is formed as a circular or rectangular annular rim that protrudes in axial direction towards the seat surface.

14. The acoustic valve according to claim 1, wherein the shutter member is moveable relative to the seat member along an actuation direction;

and wherein the shutter member incorporates a permanent or switchable magnet, the magnet having a magnetic dipole moment that is essentially aligned with the actuation direction of the shutter member.

15. Hearing device, comprising a receiver housing adapted to be placed in an ear canal, the receiver housing comprising:

an acoustic transducer configured to generate an acoustic output signal based on a received electric input signal, for instance from a microphone;

an acoustic channel with an outlet for conveying the acoustic output signal from the acoustic transducer towards an eardrum in an inner region of the ear canal;

a passageway forming an interconnection between a first aperture and a second aperture provided at distinct portions of the receiver housing, wherein the outlet of the acoustic channel discharges into the passageway, and wherein the passageway is adapted to allow ambient sound to propagate from an outer region of the ear canal, via the apertures and passageway, to the inner region, and an acoustic valve in the passageway and adapted to transition between opened and closed states according to claim 1.

* * * * *